US010838487B2

(12) United States Patent
Ortiz Egea

(10) Patent No.: US 10,838,487 B2
(45) Date of Patent: Nov. 17, 2020

(54) MIXED PIXEL UNWRAPPING ERROR MITIGATION BY FILTERING OPTIMIZATION

(71) Applicant: MICROSOFT TECHNOLOGY LICENSING, LLC, Redmond, WA (US)

(72) Inventor: Sergio Ortiz Egea, San Jose, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/391,117

(22) Filed: Apr. 22, 2019

(65) Prior Publication Data

US 2020/0333877 A1   Oct. 22, 2020

(51) Int. Cl.
*G06F 3/01* (2006.01)
*G02B 27/00* (2006.01)
*G02B 27/01* (2006.01)

(52) U.S. Cl.
CPC ......... *G06F 3/012* (2013.01); *G02B 27/0025* (2013.01); *G02B 27/0093* (2013.01); *G02B 27/0172* (2013.01)

(58) Field of Classification Search
CPC . G06F 3/012; G02B 27/0025; G02B 27/0093; G02B 27/0172
See application file for complete search history.

(56) References Cited

U.S. PATENT DOCUMENTS

| | | |
|---|---|---|
| 2014/0354775 A1 | 12/2014 | Barsoum et al. |
| 2018/0210070 A1 | 7/2018 | Bleyer et al. |
| 2020/0051218 A1* | 2/2020 | Hyun ............... G06T 5/005 |

OTHER PUBLICATIONS

Lenzen, et al., "Denoising Strategies for Time-of-Flight Data", In Proceedings of International Conference on Pervasive Computing, Aug. 1, 2013, pp. 25-45.
Li, Larry, "Filtering for 3D Time-of-Flight Sensors", In White Paper of Texas Instruments, SLOA230, Jan. 31, 2016, 9 Pages.
"International Search Report and Written Opinion Issued in PCT Application No. PCT/US20/026048", dated Jul. 6, 2020, 13 Pages.

* cited by examiner

*Primary Examiner* — Lisa S Landis
(74) *Attorney, Agent, or Firm* — Workman Nydegger

(57) ABSTRACT

Systems and methods are provided for providing an improved optical tracking signal. A system receives an input signal which is based on a reflected optical signal comprising light reflected off of two or more real-world objects. The input signal includes a first region representing light reflected off of a first real-world object, a second region representing light reflected off of a second real-world object, and a transition region between the first region and the second region. The input signal includes jitter in at least one of the first region, the second region, or the transition region. The system also performs a sharpening operation to sharpen the transition region for an output signal created from the input signal. The sharpening operation includes a complex operation utilizing both real and imaginary components of the input signal. The system also outputs the output signal as an improved version of the input signal.

20 Claims, 5 Drawing Sheets

MIXED PIXEL UNWRAPPING ERROR MITIGATION BY FILTERING OPTIMIZATION

BACKGROUND

Background and Relevant Art

Optical tracking has become a useful and ubiquitous process. In some optical tracking systems, such as time-of-flight cameras, optical tracking involves a transmitter emitting optical signals, such as infrared or laser signals, directed at objects, capturing reflected optical signals, and using the captured, reflected signals, to track various objects. For example, optical tracking may be used to sense distances of objects in an environment. Using dual optical trackers can be useful for 3-D tracking.

This optical tracking may be used for a number of different purposes. For example, optical trackers may be implemented on head mounted displays (HMDs) used in augmented reality or virtual reality. The optical trackers in these scenarios may be used to track locations of objects in an environment with respect to the HMD. This may be useful to help a user avoid and/or locate physical object in a room. Also, this can be used to sense movement over time of the user's head. In other words, such optical tracking may be used to perform head tracking (HeT) operations, which are useful in providing a rich and realistic augmented reality or virtual reality experience by presenting virtual objects to a user based on the user's head movements.

Alternatively, optical tracking may be included in a stationary device where tracking of moving objects in an environment can be accomplished. For example, a stationary device may detect user movements by detecting changes in user distance from the stationary device.

Optical trackers may suffer from a number of issues. For example: edges, corners, or other abrupt changes in objects in an environment can be particularly difficult to accurately track. That is, optical trackers may have ambiguities/artifacts that are caused when attempting to identify distances (e.g., distance from an optical tracker) at real-world locations where there are sharp changes in shape, color, and/or distance. This can be especially problematic in head tracking implementations which rely on edge detection. Additionally, even when an object is a fixed distance from a tracking device, a tracking signal may have noise known as jitter. These issues can result in inaccurate optical tracking. It is therefore useful to provide optical tracking methods and systems for removing jitter and for limiting artifacts that might arise when tracking locations with abrupt changes in shape, color, and/or distance (e.g., at edges of objects).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems and methods for providing an improved optical tracking signal.

In some embodiments, a system receives an input signal which is based on a reflected optical signal comprising light reflected off of two or more real-world objects. The input signal includes a first region representing light reflected off of a first real-world object, a second region representing light reflected off of a second real-world object, and a transition region between the first region and the second region. The input signal includes jitter in at least one of the first region, the second region, or the transition region.

The system also performs a sharpening operation to sharpen the transition region for an output signal created from the input signal. The sharpening operation includes a complex operation utilizing both real and imaginary components of the input signal. The system also outputs the output signal as an improved version of the input signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein are directed to systems that can receive, as input, an input signal (such as a tracking signal) and perform smoothing operations to remove or reduce noise at regions in the input signal and sharpen transitions between regions in the input signal. For example, different regions of an input signal can represent optical reflections from different objects/materials in a real-world environment, and transitions between such regions can represent an edge, or a transition, between different objects/materials in a real-world environment. Thus, transitions between regions in an input signal can, in some embodiments, represent real-world transitions between real-world objects.

A smoothing operation is performed to reduce noise in the various regions of the signal. A sharpening operation is performed to sharpen transitions between different regions of the input signal. The sharpening operation uses complex operations, which utilize real and imaginary components. Performing these operations results, for example, in an output signal that provides more accurate and stable distance measurements. Put differently, performing these smoothing and sharpening operations on an input signal can generate/provide an output signal that more accurately represents the characteristics/attributes of the real-world objects being tracked (e.g., distance from a detector, motion characteristics, depth, etc.). Further, by using the real and imaginary components, generation of "flying pixel" artifacts can be reduced or eliminated.

Having just described some of the various high-level features and benefits of the disclosed embodiments, attention will now be directed to FIGS. 1-4. These figures illustrate various functionalities, examples, supporting illustrations, and methods related to detecting user-object interactions in mixed-reality environments. Subsequently, attention will be directed to FIG. 5, which presents an example computer system that may be used to facilitate the disclosed principles.

Figure 1:
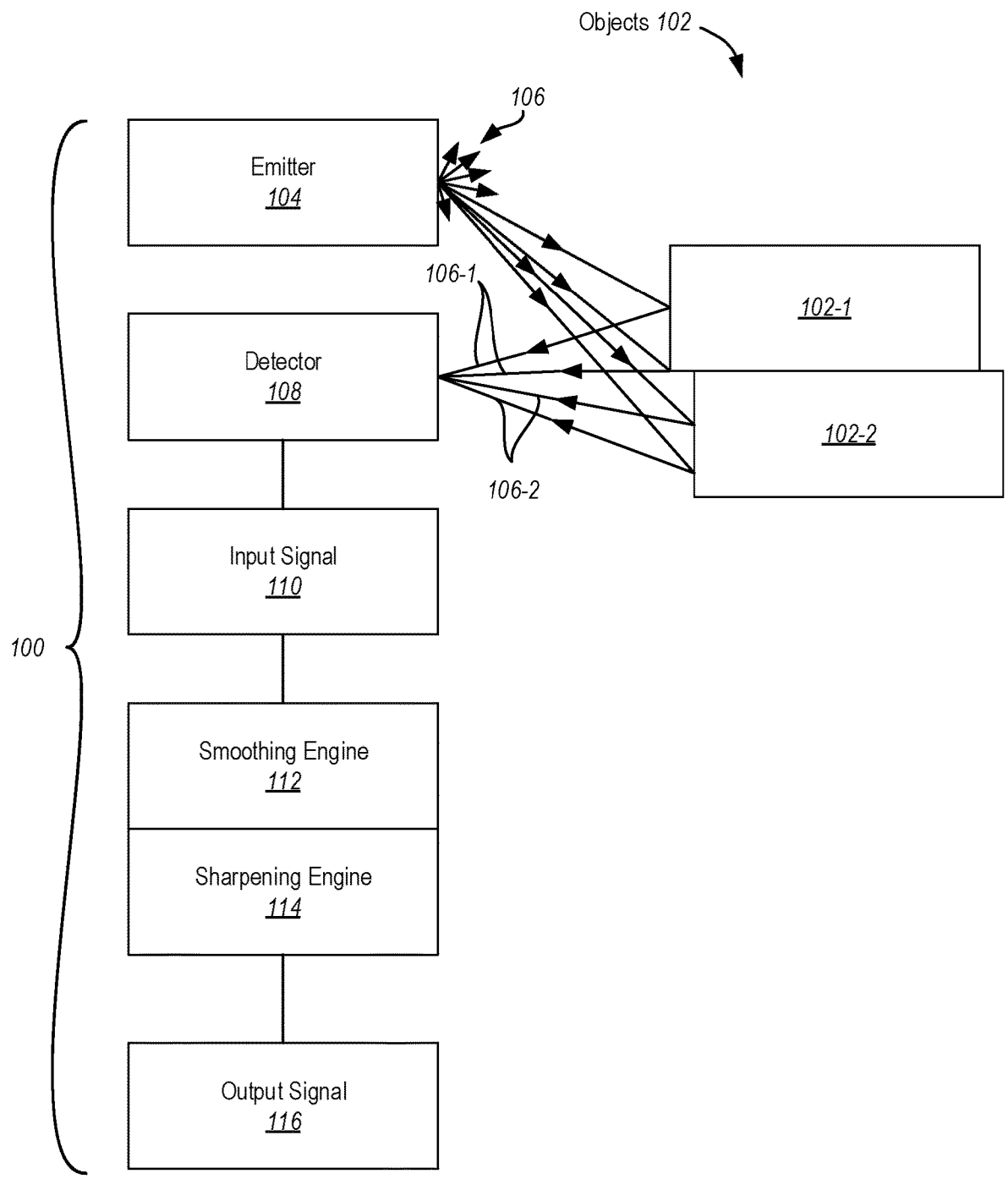
FIG. 1 illustrates an exemplary embodiment of a system performing optical tracking to track real-world objects.

FIG. 1 illustrates an exemplary embodiment of a system 100 performing optical tracking to track real-world objects. For example, in some embodiments system 100 is implemented, in whole or in part, as a time-of-flight camera system of a user device (e.g., a head-mounted display (HMD), gaming console, or other computer system) for tracking real-world objects in the vicinity of the user device. In some implementations, tracking real-world objects is useful for head tracking in HMDs (e.g., by detecting the edges or corners of real-world objects over time, a system can determine how the HMD has moved with respect to the real-world objects over time).

Continuing with FIG. 1, the system 100 illustrates a system that is able to use optical signals to detect distances from the system 100 (or any particular part of the system 100) to objects 102. The system 100 includes an emitter 104. In some embodiments, the emitter is implemented as one or more light emitting diodes (LEDs), laser diodes, and/or any other illumination unit which is suitable for emitting modulated light. The emitter 104 emits an optical signal 106. For example, the optical signal may be a set of laser pulses, infrared light pulses, or another appropriate optical signal. It will be appreciated that the emitter 104 can be configured to emit light at any desired wavelength or band of wavelengths (e.g., in the visible spectrum, near IR spectrum, IR spectrum, etc.).

As is evident in FIG. 1, optical signal 106 is emitted from emitter 104 in a plurality of directions, such that different portions of optical signal 106 reflect off of different objects 102 in the real-world environment of system 100. A first portion of the optical signal 106 reflects off of object 102-1, resulting in reflected optical signal 106-1, and a second portion of the optical signal 106 reflects off of object 102-2, resulting in reflected optical signal 106-2.

Both reflected optical signal 106-1 and reflected optical signal 106-2 are received by detector 108. The detector 108 may include, for example, various photodiodes, cameras, and/or other sensor hardware that is able to convert the reflected optical signals 106-1 and 106-2 to an input signal 110. In some instances, the detector 108 includes a plurality of pixels for detecting reflected optical signals 106-1 and 106-2. The input signal 110 is an electrical signal created by the detector 108 from the reflected optical signals 106-1 and 106-2. Various attributes of the reflected optical signals 106-1 and 106-2, such as the phase and the active brightness (e.g., an amount of intensity collected) can be determined from the input signal 110 received by the detector 108. By analyzing properties of the input signal 110 (e.g., compared with or correlated with the properties of the optical signal 106 initially emitted by emitter 104), system 100 can determine distance between system 100 and objects 102 (e.g., objects 102-1 and 102-2, which reflect reflected optical signals 106-1 and 106-2 toward detector 108). In some instances, the distance between system 100 and objects 102 is determined on a pixel-by-pixel basis (e.g., based on the detections of the various pixels of detector 108).

The reflected optical signals 106-1 and 106-2 will have a shifted phase and changed intensity based on travel to and from, and being reflected off of the objects 102-1 and 102-2, respectively, as compared to the original phase and intensity of the optical signal 106 when transmitted from the emitter 104. The change in phase is related to the distance the signal has traveled. In particular, phase is related to the distance traveled by $$\phi = \frac{4\pi d}{c} f,$$

where $\phi$ is the detected phase of the detected optical signal, d is the distanced traversed, f is the modulation frequency of the light, and c is the speed of the light. Thus, the total distance traveled is proportional to the phase of the signal received at the detector 108. The intensity of the signal received at the detector 108 will also depend on the distance traveled, in particular because the intensity is proportional to the distance traveled by an inverse square relationship.

It is noted that object 102-1 and 102-2 are at different positions with respect to system 100. In particular, object 102-2 is positioned further from system 100 than object 102-1. Accordingly, the path traversed by reflected optical signal 106-2 is longer than reflected optical signal 106-1. Thus, the detected phase and active brightness of the two reflected optical signals 106-1 and 106-2 will also be different.

Intensity also changes based on the color of the object reflecting the signal. For example, a dark object will absorb more (and reflect less) of the light and reduce the intensity more than a lighter-colored object. Accordingly, differences in color between object 102-1 and 102-1 (if there are differences) will affect the intensity of the reflected optical signals 106-1 and 106-2 received by detector 108.

As noted above, the change in phase and intensity can be used to determine the distance of the objects 102-1 and 102-2 from the system 100. This can be done by examination of the input signal 110, or other signals created from the input signal 110, as compared with the optical signal 106 as emitted by emitter 104.

Although objects 102-1 and 102-2 are shown as distinct objects, it will be appreciated that objects 102-1 and 102-2 can correspond to different parts of a single object. For example, objects 102-1 and 102-2 can correspond to different elements, textures, or portions of a single object or environment, each being positioned at a different distance from system 100. Also, it will be noted that objects 102 need not be thought of as having homogeneous features (e.g., color, texturing), and that differences in each individual object would be reflected in the phase and/or intensity of the reflected optical signals received by detector 108. For example, object 102-1 could have a dark portion and a bright portion, and each portion of object 102-1 would reflect a different intensity of light.

Those skilled in the art will recognize that, in some embodiments, emitter 104 is configured to simultaneously or sequentially emit an optical signal composed of different modulation frequencies (e.g., 2, 3, 4, or more different modulation frequencies), all of which may be reflected off of objects 102 to cause reflected optical signals which are detected by detector 108. Thus, a reflected optical signal can comprise various different modulation frequencies, and an input signal 110 can be generated based on some or all of the different modulation frequencies of the reflected optical signal.

Figure 2:
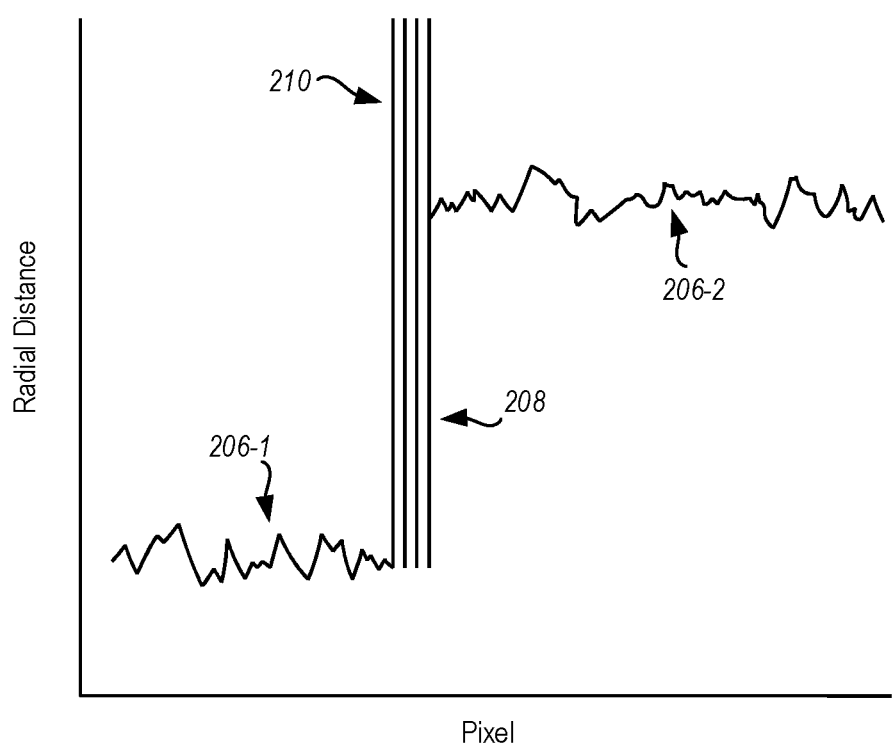
FIG. 2 shows an exemplary input signal including jitter and artifacts.

FIG. 2 shows an exemplary input signal, which is a conceptual representation of input signal 110 described above with reference to FIG. 1. The input signal 110 is shown along a vertical axis indicating radial distance (e.g., distance between the system 100 and objects 102) and a horizontal axis indicating pixel (e.g., the different optical signal detection pixels of detector 108). In essence, the representation of input signal 110 shown in FIG. 2 demonstrates a profile of the objects 102-1 and 102-2, based on the reflected optical signals 106-1 and 106-2 received by detector 108.

For example, the input signal 110 is shown as having three regions: region 206-1, region 206-2, and region 208. Region 206-1 corresponds to the part of the input signal 110 that is based on the reflected optical signal 106-1, which was reflected off of object 102-1 toward detector 108. Similarly, region 206-2 corresponds to the part of the input signal 110 that is based on the reflected optical signal 106-2, which was reflected off of object 102-2 toward detector 108. Accordingly, region 206-1 indicates a nearer radial distance (e.g., distance from system 100), while region 206-2 indicates a further radial distance, since object 102-2 is situated further from system 100 than object 102-1.

Region 208 represents a transition region between region 206-1 and region 206-2. For example, region 208 corresponds to the part of input signal 110 that is based on optical reflections from the edge, or near the edge, of object 102-1. Put differently, region 208 corresponds to a real-world transition (or edge) between object 102-1 and 102-2, as detected by detector 108.

As is evident in FIG. 2, regions 206-1 and 206-2 include noise (also referred to herein as jitter). The noise occurs, in some embodiments, because the phase of the signal, as detected by a detector 108 to create input signal 110, implies an arctangent, which is a noisy function. When both active brightness (based on intensity) and phase are being measured from the input signal 110, the noise in phase causes leakage between the measured intensity and the measured phase (e.g., the intensity and phase variables are coupled or correlated together via the noise, which comes from a single source). Thus, the noise (jitter) in phase can cause inaccuracies when calculating radial distance and/or active brightness from a detected optical signal.

As is further evident in FIG. 2, region 208 comprises artifacts 210, which indicate errors in identifying a radial distance based on the reflected optical signal detected by detection pixels within region 208. Artifacts 210 occur from reflections of the optical signal at or near the edge between object 102-1 and object 102-2. As with the jitter, artifacts 210 cause the input signal 110 to inaccurately represent the distances of objects 102-1 and 102-2 and can further cause the input signal to fail to accurately identify the edges of objects (e.g., the edge between object 102-1 and 102-2). Artifacts can occur, for example, when a high signal-to-noise ratio (SNR) exists in the signal.

Thus, to obtain a signal that accurately tracks real-world objects, the jitter and artifacts are removed from the input signal. This is particularly useful in implementations that rely on edge or corner detection (e.g., head tracking).

Conventional systems and methods for denoising input signals (e.g., input signal 110) to provide accurate optical tracking include applying a joint bilateral filter (JBLF) to filter out the noise of the signal. A JBLF is a non-linear filter where the output pixel values are determined as a weighted sum of the input pixel values. For example, a JBLF can include a gaussian smoothing function and an exponential function of the difference in the intensity of the signal detected by neighboring pixels of the detector.

Although conventional JBLF implementations can have some effect in reducing jitter, conventional JBLF implementations can give rise to several inaccuracies in an output signal produced thereby. This is, in part, because conventional JBLF implementations are weighted heavily toward intensity. Because of the weighting toward intensity, a JBLF can provide false distances for uncorrelated pixels. For example, when neighboring pixels have small (or no) differences in detected active brightness but large differences in detected phase (e.g., an edge between a closer, darker-colored object and a further, lighter-colored object), the lack of differences in active brightness will dominate the filtering, which will cause smoothing over the large differences in phase and thus provide an inaccurate, overly smoothed radial distance measurement per pixel (i.e., the detected difference in radial distance will be smaller than the true difference in radial distance between the pixels). In another example, when neighboring pixels have small (or no) differences in detected phase but large differences in detected active brightness (e.g., an edge/transition between adjacent objects of contrasted colors), the large differences in active brightness will dominate, which will cause an exaggerated difference in phase and provide exaggerated radial distance measurements per pixel (i.e., the detected difference in radial distance will be greater than the true difference in radial distance between the pixels).

In addition to causing inaccurate measurements of radial distance per pixel, JBLF intensity weighting can cause the precise location of an edge between two objects to become obscured, in particular because of the aforementioned over-smoothing and exaggerating caused. The obfuscation of the precise edge location makes a standard JBLF unusable for head tracking implementations utilizing a time-of-flight camera.

In addition to over-smoothing and/or exaggerating radial distances, a standard JBLF can fail to eliminate existing artifacts (e.g., artifacts 210 of FIG. 2) and can even cause additional artifacts, especially around edges. Specifically, when an optical signal is composed of multiple modulation frequencies (e.g., 3 different modulation frequencies), a standard JBLF operates separately on each different frequencies/channels of the signal, calculating different weighting parameters for each frequency/channel. Because the standard JBLF is weighted on intensity, a real value, differences in the calculated weighting parameters for each frequency/channel are exacerbated when neighboring pixels have large differences in detected intensity (e.g., at or near edges), resulting in artifacts.

Accordingly, at least some embodiments of the present disclosure are directed to a modified/improved JBLF which smooths jitter without compromising edge detection capabilities, thus allowing time-of-flight optical sensors to be used in implementations which rely on edge detection (e.g., HMD head tracking).

Returning to FIG. 1, system 100 includes a smoothing engine 112 and a sharpening engine 114. In some embodiments, the smoothing engine 112 and the sharpening engine perform operations on the input signal 110 to reduce noise (jitter) while improving edge-detection (e.g., eliminating artifacts, particularly around edges between real-world objects). In performing these operations, the smoothing engine 112 and the sharpening engine 114 output an output signal 116, which accurately depicts the real-world features of any objects represented in the signal.

Although the smoothing engine 112 and the sharpening engine 114 are illustratively represented as logically separate entities in FIG. 1, those skilled in the art will appreciate that the functions that will be described herein as associated with one or more of these engines can be performed by any number of software or hardware logic components. For example, the smoothing engine 112 and the sharpening engine 114 may be embodied as one or more central or specialized processing units (e.g., with any number of cores), field-programmable gate arrays (FPGAs), program-specific or application-specific integrated circuits (ASICs), program-specific standard products (ASSPs), system-on-a-ship systems (SOCs), complex programmable logic devices (CPLDs), and/or as one or more or sets of computer-executable instructions stored on one or more hardware storage devices and/or other computer-readable media.

The smoothing engine 112 performs a jitter reduction operation (e.g., a smoothing operation). In some embodiments, the smoothing operation includes a gaussian smoothing function which is based on the relative position of one or more pixels of a detector (e.g., detector 108) which detects the reflected optical signal. By way of example, and not limitation, the smoothing operation can be implemented according to the following:

$$W_1(i,j) = e^{-\|\vec{x}(i,j) - \vec{x}(m,n)\|^2 / \sigma_s^2}$$

where $\vec{x}$ is the position of the pixel in a standard image and $\sigma_s^2$ is a predefined parameter for controlling the smoothing. When a is high (e.g., relative to the high-frequency noise), $W_1(i,j)$ tends to approach a value of one, which has an averaging effect on the neighboring pixels which helps to ameliorate the jitter.

The gaussian smoothing function, if used alone, would tend to smooth out edges detected among neighboring pixels, resulting in inaccuracies similar to those described hereinabove. Accordingly, the sharpening engine 114 performs an edge-detection operation (e.g., a sharpening operation) such that when a large signal difference is detected between neighboring pixels (e.g., a large difference in detected active brightness, such as at an edge/transition between objects/colors), the difference is emphasized. In some implementations, the sharpening engine reduces the number of edge artifacts without over-smoothing or exaggerating radial distances of neighboring pixels.

Initially, the sharpening engine 114 of the present disclosure avoids overly weighting on intensity by utilizing the imaginary components of the detected signal (e.g., detected by detector 108) in addition to the real components and performing a sharpening operation in the complex domain. Rather than relying solely on differences in detected intensity of neighboring pixels (a real value), the detected signal is separated into real and imaginary components. For example, the signal can be separated according to $S_r = AB \cos(\phi)$ and $S_i = AB \sin(\phi)$, where $S_r$ is the real component of the signal, $S_i$ is the imaginary component of the signal, AB is the detected active brightness, and $\phi$ is the detected phase. In addition to providing the basis for avoiding artifacts in edge detection, in some instances this initial separation into real and imaginary components assists in reducing the noise of the output signal (e.g., output signal 116).

The sharpening operation of the sharpening engine 114 utilizes both the real and imaginary components of the detected signal, rather than just the intensity of the detected signal. In some embodiments, the sharpening operation utilizes the normalized Euclidean distance, or norm, of the detected complex signal (e.g., the real and imaginary components of the signal detected by neighboring pixels). By preserving the imaginary components of the signal in measuring signal difference (e.g., among neighboring pixels), in some embodiments, a signal sharpened by sharpening engine 114 is more accurate than a standard JBLF when neighboring pixels are uncorrelated (e.g., artifacts and noise are reduced), even where a detected signal is composed of multiple modulation frequencies/channels (e.g., differences in weights are not exaggerated). By way of example, and not limitation, the sharpening operation can be implemented according to the following:

$$W_2(i,j) = e^{-\|S(i,j) - S(m,n)\|^2 / \lambda N^2}$$

where $$\|S(i,j) - S(m,n)\|^2 = S_r^2(i,j) + S_i^2(m,n) + S_r^2(i,j) + S_i^2(m,n) - 2S_r(i,j)S_r(m,n) - 2S_i(i,j)S_i(m,n)$$

is a regularization parameter, and $N^2$ is a normalization. Accordingly, when a large difference is detected in the complex signal among neighboring pixels, the difference is emphasized in $W_2(i,j)$.

In some embodiments, dynamically calculated normalization is implemented into the sharpening operation to provide a baseline for the determined difference in the complex signal (e.g., the norm of the complex signal detected by neighboring pixels). Standard JBLF implementations do not include dynamically calculated normalization, but rather utilize a predefined parameter, which can cause small differences in detected intensity among neighboring pixels to become artificially rendered insignificant (e.g., failing to detect an edge) and large differences in detected intensity among neighboring pixels to become exaggerated (which could bring the entire exponential function to zero, nullifying denoising as well).

A dynamically calculated normalization causes the amount of sharpening effectuated by the sharpening operation to become tailored to the measured differences in the complex signal among neighboring pixels. For example, small differences in the complex signal result in a smaller normalization value (preventing small signal differences from becoming rendered insignificant), and large differences in the complex signal result in a larger normalization value (preventing large signal differences, such as large differences in active brightness, from driving the exponential function to zero). Put differently, the normalization keeps the sharpening operation within the proper range, based on the signal differences.

A dynamically calculated normalization can, in one example, be implemented as a summation of norms of real and imaginary components of the detected signal (e.g., input signal). By way of example, and not limitation, the normalization can be implemented according to the following:

$$N^2 = \sum_{i,j} \|S(i, j) - S(m, n)\|^2$$

As noted above, in some embodiments, a regularization parameter, $\lambda$, is made part of the sharpening operation. The regularization parameter can allow for additional adjustments to the sharpening operation based on other characteristics of the detected signal. For instance, in some embodiments, the regularization parameter is a function of the signal-to-noise ratio (SNR). By way of example, in response to determining that the detected signal has a high SNR, will be set to a low value (e.g., less than 1) so as to cause the sharpening operation to become emphasized, causing little denoising to occur so as to focus on the detail of the signal. Alternatively, in response to determining that the detected signal has a low SNR, will be set to a high value (e.g., greater than 1) so as to cause the smoothing operation to be emphasized to improve denoising.

In some implementations, the smoothing operation of the smoothing engine 112 and the sharpening operation of the sharpening engine 114 are performed simultaneously as a single operation. For example, in some embodiments, the smoothing operation and the sharpening operation are implemented as follows:

$$W(i,j) = W_1(i,j) W_2(i,j) = e^{-\|\vec{x}(i,j) - \vec{x}(m,n)\|^2 / \sigma_s^2} e^{-\|S(i,j) - S(m,n)\|^2 / \lambda N^2}$$

Figure 3:
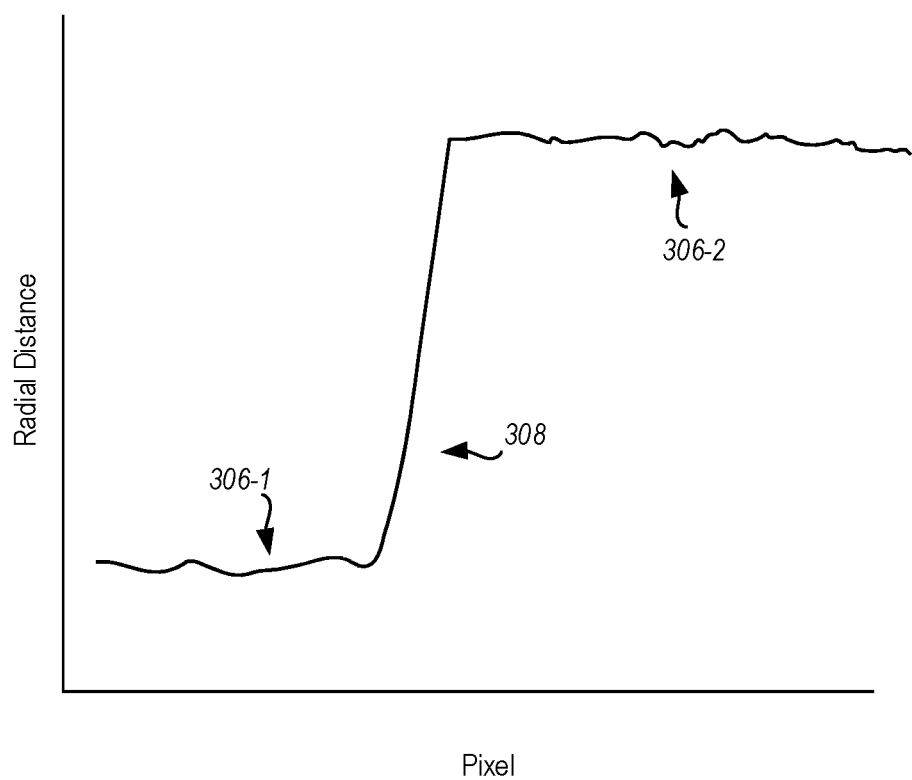
FIG. 3 shows an exemplary output signal with reduced jitter and artifacts after having smoothing and sharpening operations performed thereon, according to the present disclosure.

FIG. 3 shows an exemplary output signal (e.g., output signal 116) with reduced jitter and eliminated artifacts after having smoothing and sharpening operations performed thereon, according to the present disclosure. For example, the jitter in regions 306-1 and 306-2 is reduced, providing a more accurate representation of the radial distance of object 102-1 and 102-2, respectively. Furthermore, the artifacts which were previously evident in the transition region between the two objects 102-1 and 102-2 are eliminated from region 308 shown in FIG. 3. This allows for a more accurate representation of the location of the real-world edges/transitions with optical tracking systems, particularly time-of-flight tracking systems, potentially allowing for time-of-flight tracking systems to be used for head tracking.

In some implementations, a is set to a high value to bring about effective denoising of the high-frequency noise associated with detected signals. In some instances, this causes the smoothing operation $W_1(i,j)$ to approach a value of 1. Therefore, in some embodiments, $W(i,j)$ can be simplified by omitting $W_1(i,j)$ or setting $W_1(i,j)$ equal to 1 to save on processing/performance costs associated with carrying out the smoothing operation $W_1(i,j)$. Omitting $W_1(i,j)$ can also have a positive effect on edge detection.

Another additional step in simplifying $W(i,j)$ can be to utilize a Taylor series expansion of $W_2(i,j)$ rather than utilizing the entire exponential function as noted above. Similarly, utilizing a series expansion of the sharpening operation $W_2(i,j)$ can save on processing and/or performance costs associated with carrying out the sharpening operation as noted above. By way of example, and not limitation, $W(i,j)$ may be simplified as:

$$W(i, j) \to 1 - \frac{\|S(i, j) - S(m, n)\|^2}{\lambda N^2}$$

This simplified operation also emphasizes differences in detected active brightness or phase, and can still operate as a high-performance edge detector.

Although the smoothing operation and the sharpening operation have been described hereinabove with reference to specific mathematical operations/equations, those skilled in the art will recognize that these mathematical operations/equations are exemplary only and non-limiting. For example, rather than utilizing a Taylor series expansion to simplify $W(i,j)$, a Maclaurin, Laurent, or other series expansion could be utilized.

In some embodiments, the smoothing operation of the smoothing engine 112 and/or the sharpening operation of the sharpening engine 114 are performed on different frequencies/channels of the detected optical signal individually (e.g., separately or independently), while in other embodiments the smoothing operation and/or the sharpening operation are performed on the various channels/frequencies simultaneously. Furthermore, in some embodiments, when smoothing and/or sharpening operations are determined to yield similar results in two or more frequencies/channels of a detected signal, smoothing and/or sharpening operations can be omitted/neglected for one of the similar frequencies/channels (e.g., the same results from performing the smoothing and/or sharpening operations on one of the similar frequencies/channels can be applied to the others).

Furthermore, different types of smoothing operations and/or sharpening operations can be applied to different channels/frequencies of the detected signal. For example, one simplified sharpening operation (e.g., Taylor series expansion) can be applied to one channel, while a full sharpening operation (e.g., $W_2(i,j)$ described above) can be applied to another channel.

Still furthermore, in some embodiments, a plurality of smoothing/sharpening coefficients are calculated by performing smoothing/sharpening operations on some or all of the channels represented in the detected input signal. After calculating the plurality of smoothing/sharpening coefficients, a composite sharpening coefficient is calculated as a product of the smoothing/sharpening coefficients previously calculated for each of the channels. The composite sharpening coefficient can, in some embodiments, then be applied to each channel/frequency of the received signal to produce an output signal with even greater jitter and artifact reduction.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
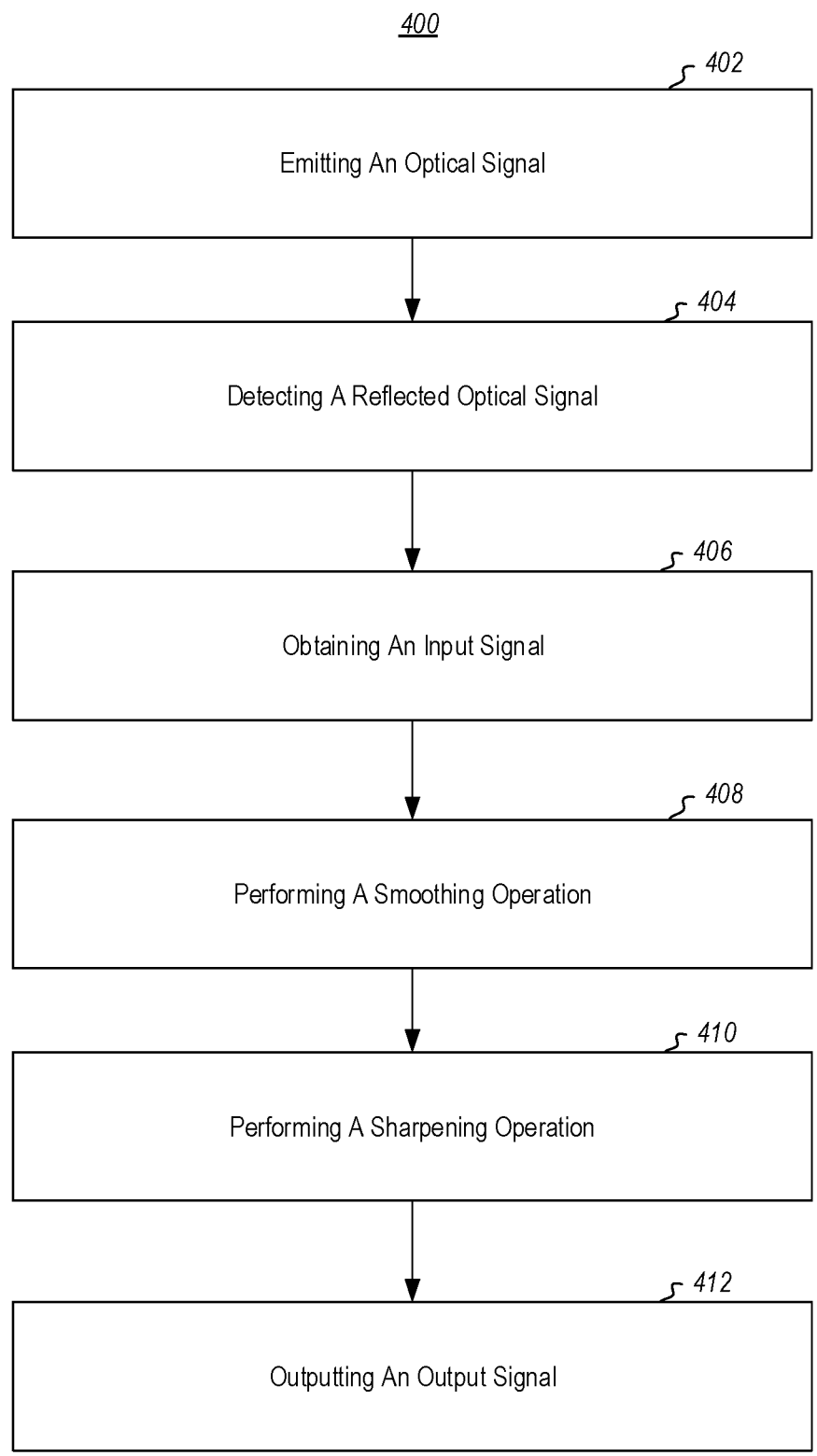
FIG. 4 shows an exemplary flow diagram depicting a method for providing improved optical tracking signals.

FIG. 4 shows a flow diagram 400 depicting acts associated with methods for providing improved optical tracking signals in a manner which includes performing a smoothing operation and a sharpening operation which utilizes complex components of an input signal. In particular, flow diagram 400 includes acts of emitting an optical signal (402), detecting a reflected optical signal (404), obtaining an input signal (406), performing a smoothing operation (408), performing a sharpening operation (410), and outputting an output signal (412).

As noted above, act 402 includes emitting an optical signal. In some embodiments, the optical signal is emitted by an emitter of a system. The optical signal can comprise a single frequency, or a plurality of different frequencies or channels which are emitted sequentially or concurrently.

Act 404 includes detecting a reflected optical signal. In some instances, the reflected optical signal comprises reflections of the optical signal emitted by the emitter off of two or more real-world objects (e.g., a first real-world object and a second real-world object), and the reflected optical signal is detected by a detector of the system (e.g., a detector with multiple detection pixels). In some embodiments, the two or more real-world objects are positioned at different distances from one or more elements of a system (e.g., the system obtaining and/or processing the reflected optical signal) and/or have different color properties.

Act 406 includes obtaining an input signal. The input signal obtained or received is based on the reflected optical signal, and the input signal can include a first region representing light reflected off of a first real-world object, a second region representing light reflected off of a second real-world object, and a transition region between the first region and the second region. In some instances, the input signal includes jitter and/or artifacts in at least one of the first region, the second region, or the transition region.

Act 408 includes performing a smoothing operation. In some embodiments, the smoothing operation is performed to smooth the jitter for an output signal created from the input signal. The smoothing operation includes, in some instances, a gaussian smoothing function based on the relative position of one or more pixels of a detector for detecting the reflected optical signal.

Act 410 includes performing a sharpening operation. In some embodiments, the sharpening operation is performed to sharpen the transition region for the output signal created from the input signal. The sharpening operation includes a complex operation which utilizes both real and imaginary components of the input signal. In some embodiments, the sharpening operation includes an exponential function of a norm of a plurality of real and imaginary components of the input signal. Furthermore, in some instances, the exponential function further includes a normalization comprising a summation of norms of real and imaginary components of the input signal. Still furthermore, the exponential function can include a regularization parameter, which is dynamically calculated based on the SNR of the input signal.

In some instances, the sharpening operation is a simplified sharpening operation, which is implemented as a Taylor series expansion of the aforementioned exponential function.

In some implementations, the smoothing operation of act 408 and/or the sharpening operation of act 410 are performed on one or more channels of a plurality of different channels of the input signal individually. For example, in some embodiments, the smoothing operation and/or sharpening operation applied to one channel of the plurality of different channels differs from at least one other channel of the plurality of different channels.

Furthermore, in some embodiments, a composite smoothing and/or sharpening coefficient is created, which is a product of a plurality of sharpening coefficients calculated from performing smoothing and/or sharpening operations on the channels of the input signal. The composite smoothing and/or sharpening coefficient is then applied to the various channels of the input signal to create the output signal.

Act 412 includes outputting an output signal. Based on the smoothing operation(s) and/or sharpening operation(s) performed, the output signal will have reduced jitter and/or reduced or eliminated artifacts, particularly around edges, making the output signal suitable for implementations which rely on edge detection (e.g., head tracking, object tracking).

The disclosed embodiments may, in some instances, provide various advantages over conventional systems and methods for performing optical tracking, particularly time of flight camera systems. Some of these advantages include providing an output signal that reduces or eliminates artifacts/ambiguities and has reduced jitter, thus providing a more accurate depiction of the characteristics (e.g., edge/color characteristics, distance from tracking system, etc.) of the real-world objects represented in the signal.

Figure 5:
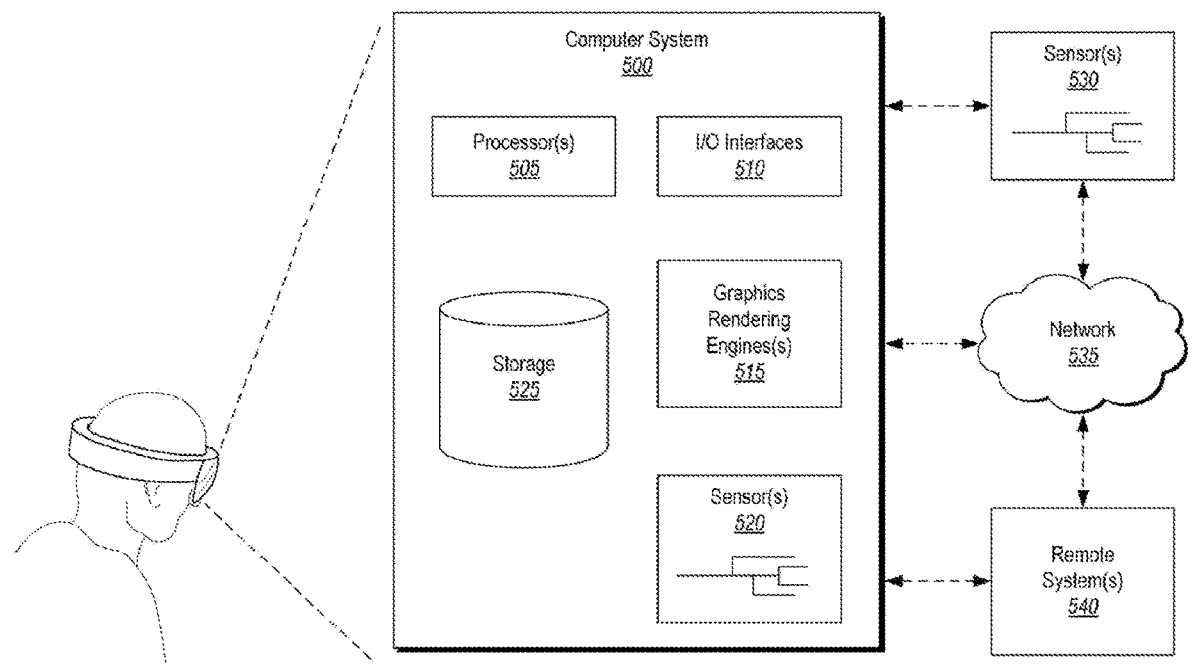
FIG. 5 shows an exemplary computer system that may be used to perform embodiments disclosed herein.

Having just described the various features and functionalities of some of the disclosed embodiments, attention is now directed to FIG. 5, which illustrates an example computer system 500 that may be used to facilitate the operations described herein. It will be appreciated that, in some instances, aspects of the system 100 shown in FIG. 1 and the computer system 500 shown in FIG. 5 can be used in combination to carry out the embodiments described herein.

The computer system 500 may take various different forms. For example, in FIG. 5, the computer system 500 is embodied as a head-mounted display (HMD). Although the computer system 500 may be embodied as an HMD, the computer system 500 may also be a distributed system that includes one or more connected computing components/devices that are in communication with the HMD. Accordingly, the computer system 500 may be embodied in any form and is not limited strictly to the depiction illustrated in FIG. 5. By way of example, the computer system 500 may include a projector, desktop computer, a laptop, a tablet, a mobile phone, server, data center and/or any other computer system.

In its most basic configuration, the computer system 500 includes various different components. For example, FIG. 5 shows that computer system 500 includes at least one hardware processing unit 505 (aka a "processor"), input/output (I/O) interfaces 510, graphics rendering engines 515, one or more sensors 520, and storage 525. More detail on the hardware processing unit 505 will be presented momentarily.

The storage 525 may be physical system memory, which may be volatile, non-volatile, or some combination of the two. The term "memory" may also be used herein to refer to non-volatile mass storage such as physical storage media. If the computer system 500 is distributed, the processing, memory, and/or storage capability may be distributed as well. As used herein, the term "executable module," "executable component," or even "component" can refer to software objects, routines, or methods that may be executed on the computer system 500. The different components, modules, engines, and services described herein may be implemented as objects or processors that execute on the computer system 500 (e.g. as separate threads).

The disclosed embodiments may comprise or utilize a special-purpose or general-purpose computer including computer hardware, such as, for example, one or more processors (such the hardware processing unit 505) and system memory (such as storage 525), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 500 may also be connected (via a wired or wireless connection) to external sensors 530 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses. For example, the sensors 520/530 can include an emitter 104 and/or a detector 108, as described hereinabove with reference to FIG. 1. Further, the computer system 500 may also be connected through one or more wired or wireless networks 535 to remote systems(s) 540 that are configured to perform any of the processing described with regard to computer system 500.

During use, a user of the computer system 500 is able to perceive information (e.g., a mixed-reality environment) through a display screen that is included among the I/O interface(s) 510 and that is visible to the user. The I/O interface(s) 510 may include the input elements described herein, which are linked to one or more underlying applications generating information for the mixed-reality scene.

The I/O interface(s) 510 and sensors 520/530 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The graphics rendering engine 515 is configured, with the hardware processing unit 505, to render one or more virtual objects within the scene. As a result, the virtual objects accurately move in response to a movement of the user and/or in response to user input as the user interacts within the virtual scene.

A "network," like the network 535 shown in FIG. 5, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 500 will include one or more communication channels that are used to communicate with the network 535. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions (e.g., the processes described hereinabove with respect to the smoothing engine 112 and the sharpening engine 114). The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the hardware processing unit 505). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A system for providing improved optical tracking signals, the system comprising:
one or more processors;

one or more computer-readable storage media having computer-executable instructions that are operable, when executed by the one or more processors, to cause the system to perform the following:
  receive an input signal, the input signal being based on a reflected optical signal comprising light reflected off of two or more real-world objects, the input signal including a first region representing light reflected off of a first real-world object, a second region representing light reflected off of a second real-world object, and a transition region between the first region and the second region, wherein the input signal includes jitter in at least one of the first region, the second region, or the transition region;
  perform a sharpening operation to sharpen the transition region for an output signal created from the input signal, wherein the sharpening operation includes a complex operation such that the operation operates on at least one real component and at least one imaginary component of the input signal; and
  output the output signal as an improved version of the input signal.

2. The system of claim 1, wherein the system further comprises an emitter and wherein the reflected optical signal comprises reflections of an optical signal initially emitted by the emitter.

3. The system of claim 1, wherein the system further comprises a detector and wherein the input signal is received by the detecting the reflected optical signal with the detector.

4. The system of claim 1, wherein the first real-world object and the second real-world object are positioned at different distances from one or more elements of the system.

5. The system of claim 1, wherein the first real-world object and the second real-world object have different color properties.

6. The system of claim 1, wherein the computer-executable instructions are further operable to cause the system to perform a smoothing operation to smooth the jitter for the output signal, wherein the smoothing operation comprises a gaussian smoothing function based on a relative position of one or more pixels of a detector for detecting the reflected optical signal.

7. The system of claim 1, wherein the sharpening operation comprises an exponential function of a norm of a plurality of real and imaginary components of the input signal.

8. The system of claim 7 wherein the exponential function further includes a normalization comprising a summation of norms of real and imaginary components of the input signal.

9. The system of claim 7, wherein the exponential function further includes a regularization parameter, wherein the regularization parameter is dynamically calculated based on a signal-to-noise ratio of the input signal.

10. The system of claim 1, wherein the sharpening operation is a simplified sharpening operation comprising a Taylor series expansion of an exponential function of a norm of a plurality of real and imaginary components of the input signal.

11. The system of claim 1, wherein the input signal comprises a plurality of different channels for different frequencies, and wherein the sharpening operation is performed on one or more channels of the plurality of different channels individually.

12. The system of claim 11, wherein the sharpening operation applied to one channel of the plurality of different channels differs from at least one other channel of the plurality of different channels.

13. The system of claim 11, wherein the computer-executable instructions are further operable to cause the system to create a composite sharpening coefficient, the composite sharpening coefficient being a product of a plurality of sharpening coefficients calculated from performing the sharpening operation on the one or more channels of the plurality of different channels.

14. A method for providing improved optical tracking signals, the method comprising:
  receiving an input signal, the input signal being based on a reflected optical signal comprising light reflected off of two or more real-world objects, the input signal including a first region representing light reflected off of a first real-world object, a second region representing light reflected off of a second real-world object, and a transition region between the first region and the second region, wherein the input signal includes jitter in at least one of the first region, the second region, or the transition region;
  performing a sharpening operation to sharpen the transition region for an output signal created from the input signal, wherein the sharpening operation includes a complex operation such that the operation operates on at least one real component and at least one imaginary component of the input signal; and
  outputting the output signal as an improved version of the input signal.

15. The method of claim 14, wherein the method further comprises performing a smoothing operation to smooth the jitter for the output signal, wherein the smoothing operation comprises a gaussian smoothing function based on a relative position of one or more pixels of a detector for detecting the reflected optical signal.

16. The method of claim 14, wherein the sharpening operation comprises an exponential function of a norm of a plurality of real and imaginary components of the input signal.

17. The method of claim 16 wherein the exponential function further includes a normalization comprising a summation of norms of real and imaginary components of the input signal.

18. The method of claim 16, wherein the exponential function further includes a regularization parameter, wherein the regularization parameter is dynamically calculated based on a signal-to-noise ratio of the input signal.

19. The method of claim 14, wherein the sharpening operation is a simplified sharpening operation comprising a Taylor series expansion of an exponential function of a norm of a plurality of real and imaginary components of the input signal.

20. One or more hardware storage devices having stored thereon computer-executable instructions, the computer-executable instructions being executable by one or more processors of a computer system to cause the computer system to:
  receive an input signal, the input signal being based on a reflected optical signal comprising light reflected off of two or more real-world objects, the input signal including a first region representing light reflected off of a first real-world object, a second region representing light reflected off of a second real-world object, and a transition region between the first region and the second region, wherein the input signal includes jitter in at least one of the first region, the second region, or the transition region;
  perform a sharpening operation to sharpen the transition region for an output signal created from the input signal, wherein the sharpening operation includes a complex operation such that the operation operates on at least one real component and at least one imaginary component of the input signal; and output the output signal as an improved version of the input signal.

\* \* \* \* \*